United States Patent
Kochura et al.

(10) Patent No.: US 11,132,709 B2
(45) Date of Patent: Sep. 28, 2021

(54) IMPLEMENTATION OF PHYSICAL CHANGES TO DEVICES FOR EFFECTIVE ELECTRONIC CONTENT RECEPTION

(71) Applicant: International Business Machines Corporation, Armonk, NY (US)

(72) Inventors: Nadiya Kochura, Bolton, MA (US); Janani Janakiraman, Austin, TX (US); Fang Lu, Billerica, MA (US); Susan M. Cox, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 429 days.

(21) Appl. No.: 15/828,019

(22) Filed: Nov. 30, 2017

(65) Prior Publication Data
US 2019/0164191 A1    May 30, 2019

(51) Int. Cl.
*G06Q 30/02*    (2012.01)
*G06F 3/0487*    (2013.01)
(Continued)

(52) U.S. Cl.
CPC ....... *G06Q 30/0255* (2013.01); *G06F 3/0487* (2013.01); *G06F 16/23* (2019.01);
(Continued)

(58) Field of Classification Search
CPC .... G06Q 30/0255; G06Q 50/01; G06F 16/23; G06F 3/0487; G06F 16/86; G06F 16/437;
(Continued)

(56) References Cited

U.S. PATENT DOCUMENTS 6,218,966 B1    4/2001  Goodwin et al.
6,825,859 B1    11/2004  Severenuk et al.
(Continued)

FOREIGN PATENT DOCUMENTS

CN    103714071 A    4/2014

OTHER PUBLICATIONS

Toward computers that recognize and respond to user emotion; Picard, R W. IBM Systems Journal , p. 1 (Year: 2000).*
(Continued)

*Primary Examiner* — John Van Bramer
*Assistant Examiner* — Darnell A Pouncil
(74) *Attorney, Agent, or Firm* — Heslin Rothenberg Farley & Mesiti P.C.; Noah Sharkan, Esq.

(57) ABSTRACT

A method, computer program product, and system includes a processor(s) obtaining content displayed to the user on a computing device communicatively coupled to an input device(s) and/or output device(s). The processor(s) analyzes the content, to identify portions that represent types of content and tags the identified portions with one or more generic tags. The processor(s) generates a sentiment profile of the user by identifying interests of the user and identifying subjects of past electronic communications by the user. The processor(s) maps sentiments in the sentiment profile, to topics, based on the interests and the subjects identified. The processor(s) identifies an identified portion of the content relevant to a topic(s) mapped to a sentiment. The processor(s) generates and implements a physical change to the input device(s) or output device(s) to elicit a sentiment from the user, where the sentiment is mapped to the topic(s).

16 Claims, 6 Drawing Sheets

(51) Int. Cl.
    *H04L 29/08*     (2006.01)
    *G06F 16/23*     (2019.01)
    *G06Q 50/00*     (2012.01)
    *G06F 16/84*     (2019.01)
    *G06F 16/435*     (2019.01)

(52) U.S. Cl.
    CPC ......... *H04L 67/025* (2013.01); *G06F 16/437* (2019.01); *G06F 16/86* (2019.01); *G06Q 50/01* (2013.01)

(58) Field of Classification Search
    CPC ..... G06F 16/906; G06F 16/36; H04L 67/025; H04L 67/10; H04L 67/1097; H04L 67/306
    See application file for complete search history.

(56) References Cited

U.S. PATENT DOCUMENTS

| | | | |
|---|---|---|---|
| 7,423,631 B2 | 9/2008 | Shahoian et al. | |
| 8,411,029 B2 | 4/2013 | Casparian et al. | |
| 8,788,495 B2 | 7/2014 | Shu | |
| 2001/0035854 A1* | 11/2001 | Rosenberg | G06F 3/03543<br>345/156 |
| 2010/0250554 A1* | 9/2010 | Shu | G06Q 30/02<br>707/748 |
| 2013/0018957 A1* | 1/2013 | Parnaby | G06Q 50/01<br>709/204 |
| 2014/0188552 A1* | 7/2014 | Chan | G06Q 50/01<br>705/7.29 |
| 2016/0350664 A1 | 12/2016 | Devarajan et al. | |
| 2017/0201481 A1* | 7/2017 | Bisarya | H04L 67/306 |
| 2018/0358008 A1* | 12/2018 | Johnson, Jr. | G10L 15/22 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

"Boost Fundraising With Something Simple: Sandpaper", https://phys.org/news/2016-03-boost-fundraising-simple-sandpaper.html, Mar. 25, 2016, 3 pages.

* cited by examiner

IMPLEMENTATION OF PHYSICAL CHANGES TO DEVICES FOR EFFECTIVE ELECTRONIC CONTENT RECEPTION

BACKGROUND

Users are confronted with an overwhelming amount of content, delivered utilizing computing technologies, every day. Presenting information in a manner that is more attractive/palatable to a given user would serve to distinguish that information from the overload experienced daily. Scientific data supports efforts to build effective displayed of user-targeted content, including dictating what type of information to display to a given user, the location of the information in an interface, the format of content at the location, etc.

SUMMARY

Shortcomings of the prior art are overcome and additional advantages are provided through the provision of a method for implementing a physical change to an I/O device to elicit a response from the user. The method includes, for instance: obtaining, by one or more processors, content displayed to the user on a computing device, wherein the computing device is communicatively coupled to one or more input devices or output devices; analyzing, by the one or more processors, the content, to identify portions of the content that represent types of content and tagging the identified portions with one or more generic tags, wherein each tag represents a predefined type of content; generating, by the one or more processors, a sentiment profile of the user, wherein the generating comprises: identifying interests of the user and identifying subjects of past electronic communications by the user; mapping, by the one or more processors, sentiments in the sentiment profile of the user, to topics, based on the interests and the subjects identified; identifying, by the one or more processors, based on the one or more generic tags, an identified portion of the content relevant to at least one topic mapped to a sentiment in the sentiment profile; generating, by the one or more processors, a physical change to at least one of the one or more input devices or output devices to elicit a sentiment from the user, wherein the sentiment is mapped to the at least one topic; and implementing, by the one or more processors, the physical change.

Shortcomings of the prior art are overcome and additional advantages are provided through the provision of a computer program product for implementing a physical change to an I/O device to elicit a response from the user. The computer program product comprises a storage medium readable by a processing circuit and storing instructions for execution by the processing circuit for performing a method. The method includes, for instance: obtaining, by the one or more processors, content displayed to the user on a computing device, wherein the computing device is communicatively coupled to one or more input devices or output devices; analyzing, by the one or more processors, the content, to identify portions of the content that represent types of content and tagging the identified portions with one or more generic tags, wherein each tag represents a predefined type of content; generating, by the one or more processors, a sentiment profile of the user, wherein the generating comprises: identifying interests of the user and identifying subjects of past electronic communications by the user; mapping, by the one or more processors, sentiments in the sentiment profile of the user, to topics, based on the interests and the subjects identified; identifying, by the one or more processors, based on the one or more generic tags, an identified portion of the content relevant to at least one topic mapped to a sentiment in the sentiment profile; generating, by the one or more processors, a physical change to at least one of the one or more input devices or output devices to elicit a sentiment from the user, wherein the sentiment is mapped to the at least one topic; and implementing, by the one or more processors, the physical change.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
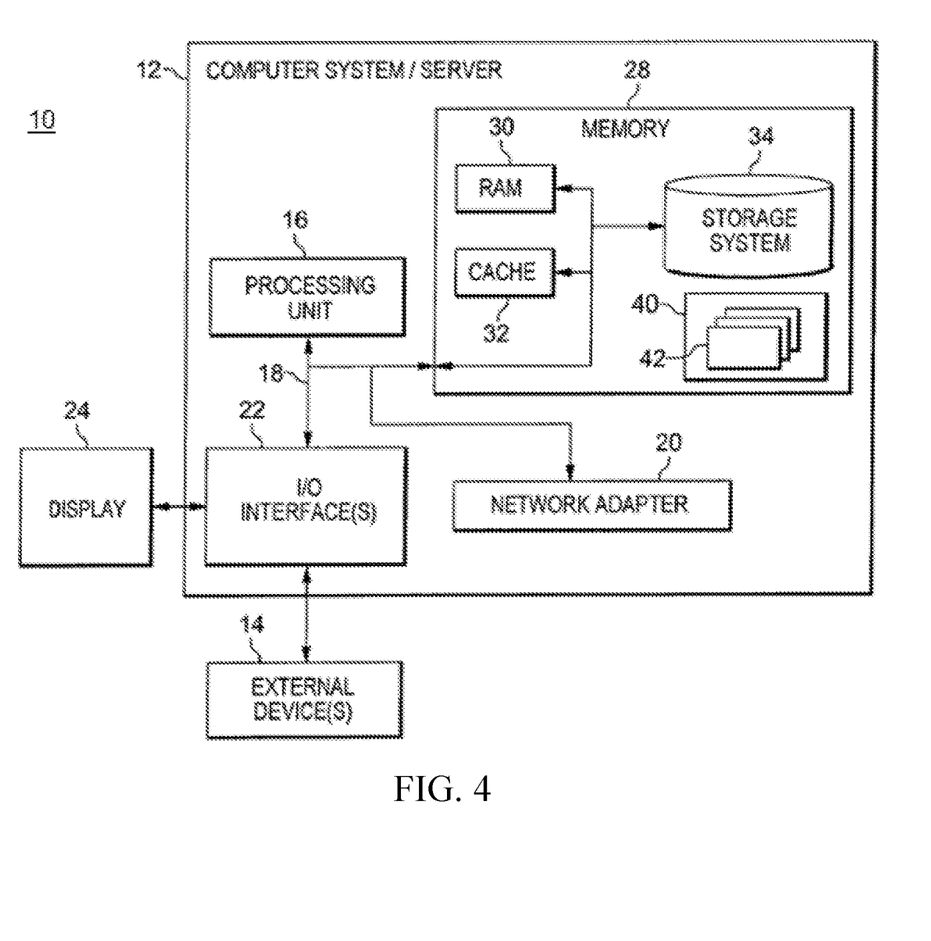
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Exploiting sensory feedback, in addition to information placement and formatting, in content delivery in computing systems, can cause a user to pay more attention to the content being delivered. Thus, embodiments of the present invention include one or more programs executed by one or more processors that enhance the effectiveness of user-targeted content by attracting the user's attention, through the user's responses to touch/light/color. To deliver content in a more effective manner, the one or more programs change various characteristics of input/output (I/O) devices coupled to a computing resource, including but not limited to, a mouse, a keyboard, and/or a display. For example, the one or more programs may change various physical characteristics of the mouse, light up certain keys on the keyboard, and/or use specific colors to change the backlight on a display, in order to draw a user's attention to content and to illicit desired sentimental responses from the user to the content.

Embodiments of the present invention include a computer-implemented method, a computer program product, and a computer system that include one or more programs that enhance the effectiveness of user targeted online content by adding haptic, color, and light sensations for information perception. In some embodiments of the present invention, one or more programs (executed by one or more processors) analyze content being presented, or to be presented, to a user, and assign sentiment tags to the content. The one or more programs map the sentiment tags with physical changes to the mouse/keyboard to attract a user's attention. Specifically, one or more programs derive a personal connection of the user to the content, by utilizing a history of user activity on social media and user specified interests. For example, the one or more program may analyze statements made by a user on various platforms, including social media, to detect the sentiments or reactions to content (e.g., posts, comments). Based on historical actions by the user, related to content, one or more programs may identify sentiments (e.g., patterns) that prompt user reactions to content, meaning that a user pays greater attention to posts with these sentiments. Upon identifying the sentiments that capture a user's attention, the one or more programs change elements of I/O devices of a computing device utilized by the user in order to elicit one or more of these sentiments. The changes may include, but are not limited to: changing the physical characteristic of I/O devices, including a mouse, keyboard, and display (e.g., changing texture of certain keys, changing the temperature of areas of the keyboard, changing the feel of the mouse, lighting certain keys on the keyboard, using specific colors to change the backlight). The one or more programs monitor the efficacy of these changes in order to improve mappings of sentiments to these haptic enhancements. In some embodiments of the present invention, the one or more programs reset the (formerly altered) physical characteristics of the mouse/keyboard, after a set amount of time and/or after the user takes some action based on displayed content.

Embodiments of the present invention are inextricably linked to computing and aspects of some embodiments of the present invention provide advantages over existing systems of enhancing content to attract user attention. In embodiments of the present invention, the one or more programs not only utilize a graphical user interface (GUI) to draw a user's attention to content, but I/O devices as well, in order to enhance content presented to a user. Delivery of content enhancements in embodiments of the present invention relies on the manipulation of I/O devices, based on content provided through computing systems. Additionally, embodiments of the present invention provide enhancements to content, including, but not limited to, changing a temperature or surface texture and/or changing a key input technique, which are enhancements that move beyond general haptic sensations techniques. The invention is additionally inextricably linked to computing because it takes an issue specific to computing, i.e., how to electronically distinguish content to a user overwhelmed by electronic content, and implements a solution to this issue that is routed in this technology, i.e., implements changes to the I/O devices utilized by the user to interact with the content in order to draw the user's attention to the content and illicit a specific sentimental response.

Aspects of various embodiments of the present invention include one or more programs implementing changes to I/O devices that are known to elicit responses in users, based on scientific facts on effectiveness of sense of touch for information perception. However, embodiments of the present invention include one or more programs that select and customize the techniques in accordance with specific users, in order to effectively elicit certain reactions from these users.

Figure 1:
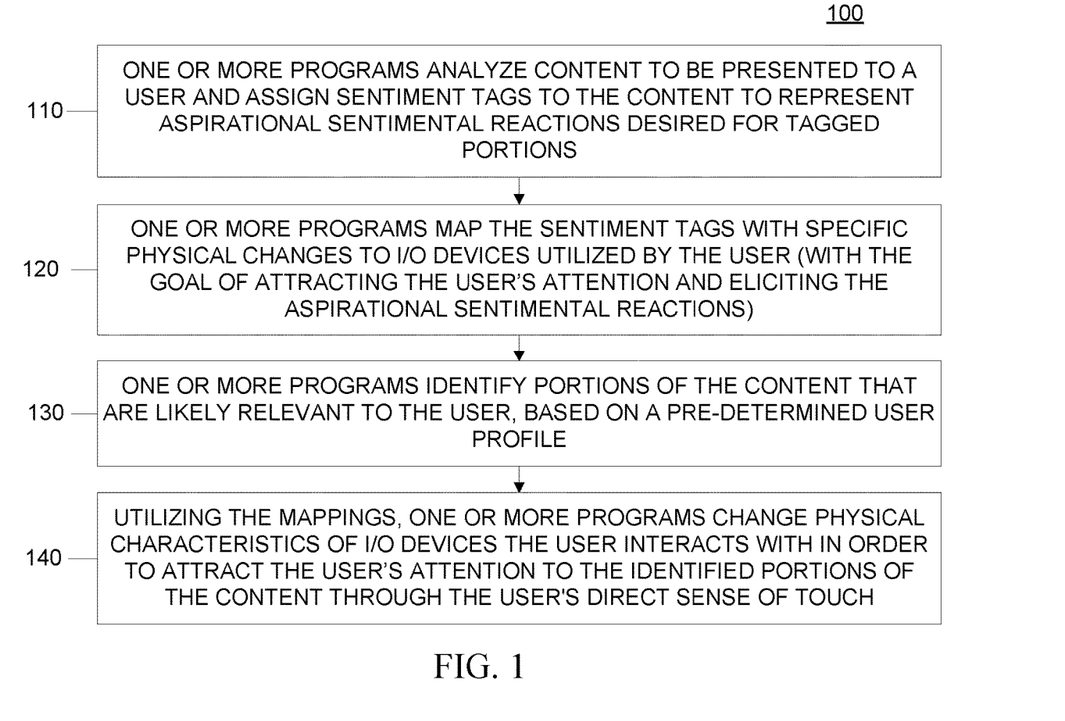
FIG. 1 is a workflow illustrating certain aspects of an embodiment of the present invention.

FIG. 1 is a workflow 100 that provides an overview of various aspects of some embodiments of the present invention. In some embodiments of the present invention, one or more programs (executed by one or more processors) analyze content to be presented to a user and assign sentiment tags to the content to represent aspirational sentimental reactions desired for tagged portions (110). The one or more programs map the sentiment tags with specific physical changes to I/O devices utilized by the user (with the goal of attracting the user's attention and eliciting the aspirational sentimental reactions) (120). The one or more programs identify portions of the content that are likely relevant to the user, based on a pre-determined user profile (130). Utilizing the mappings, the one or more programs change physical characteristics of I/O devices the user interacts with in order to attract the user's attention to the identified portions of the content through the user's direct sense of touch (140). The manner in which the one or more programs seek to draw the user's attention to the identified portions is to elicit the aspirational sentiments from the user, based on the changed physical characteristic, when the user experiences the identified portions.

Figure 2:
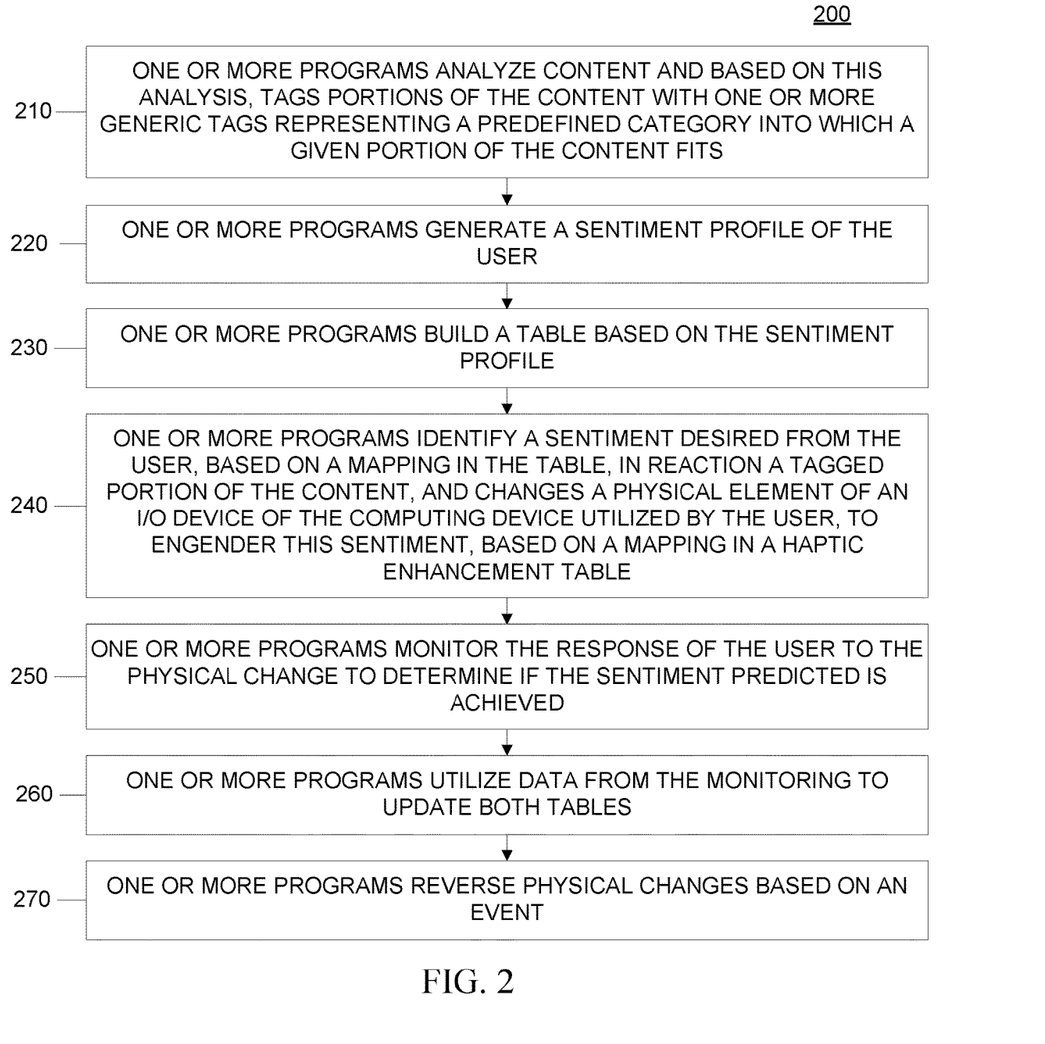
FIG. 2 is a workflow illustrating certain aspects of an embodiment of the present invention.

FIG. 2 is more detailed workflow 200 that illustrates various aspects of some embodiments of the present invention. In some embodiments of the present invention, one or more programs (executed by one or more processors) analyze content and based on this analysis, tag one or more portions of the content with one or more generic tags, each tag representing a predefined category into which a given portion of the content fits (e.g., nonprofit campaign, medical research, educational material, etc.) (210). For example, the content analyzed could be a solicitation for funds for a given non-profit cause. The one or more programs may tag the entirety of this content as a "nonprofit campaign."

The one or more programs generate a sentiment profile of the user (220). In order to generate the sentimental profile, the one or more programs gather available information related to how a user responds to different types of content. In some embodiments of the present invention, the one or more identify available data regarding the user's preferences and past interactions with and reactions to, different types of content. For example, the one or more programs analyze actions the user has taken on social media, including making posts on various topics, commenting on various topics, and/or reacting to various topics. The one or more programs may also analyze the types of content that the user does not react to. The one or more programs may also analyze information that the user has made available about the user, including any indications that the user has made regarding the user's interests, preferences, etc. The one or more programs may determine that the user is likely to have a sustained reaction (e.g., multiple comments) on a specific topic.

In some embodiments of the present invention, the one or more programs build a table (or other data structure) based on the sentiment profile (230). The table captures associations between the content and the user's sentiments (e.g., empathy, anger, excitement, etc.). The one or more programs build the table based on analyzing the sentiments of the user to detect the user's sentiments or reactions to particular posts and/or content (e.g., from social media activity). The one or more programs determine response patterns of the user regarding various content and types of content and maps the content and the response to each other, in the table. As the table includes relationships between content (or content type) and specific sentiments/responses, the one or more programs utilize this table to identify a sentiment that prompts the user to pay attention (e.g., comment, spend more time) to content. For example, the table may map environmental topics to the sentiment of excitement, because the user posts copiously on social media when environmental topics are discussed.

Embodiments of the present invention include a haptic enhancement table (or other data structure) that includes mappings of sentiments to haptic enhancements. The one or more programs reference this table to trigger specific (desired) sentiments in response to content that a user is predisposed to react to in a certain manner (based on the sentiment profile and resultant table). The haptic enhancement table is pre-configured based on scientific research regarding the effects of textures and colors on the moods of individuals. Although the table is pre-configured with available information, the one or more programs adjust this table based on monitoring reactions of users to providing the haptic enhancements.

Returning to FIG. 2, the one or more programs identify a sentiment desired (and historically possible) from the user, based on a mapping in the table, in reaction to a tagged portion of the content, and change a physical element of an I/O device of the computing device utilized by the user, to engender this sentiment, based on a mapping in the haptic enhancement table (240). The changes may include, but are not limited to, changing the texture of certain inputs on the mouse and/or keyboard, changing the temperature of areas of the input device, changing the feel (texture) of the mouse, changing the lighting of certain controls on the input device.

After implementing the physical change, the one or more programs monitor the response of the user to the physical change to determine if the sentiment predicted is achieved (250). The one or more programs utilize data from the monitoring to update both tables (i.e., the first table, which captures associations between the content and user sentiments, and the second table, which includes mappings of sentiments to haptic enhancements) (260). Thus, embodiments of the present invention consistently improve accuracy, based on additional and changing data; they are self-learning.

In some embodiments of the present invention, the one or more programs reverse physical changes based on an event (270). This event may be the passage of a predefined amount of time, the display of content with a different tag, and/or obtaining an action taken by the user, based on displayed content.

Figure 3:
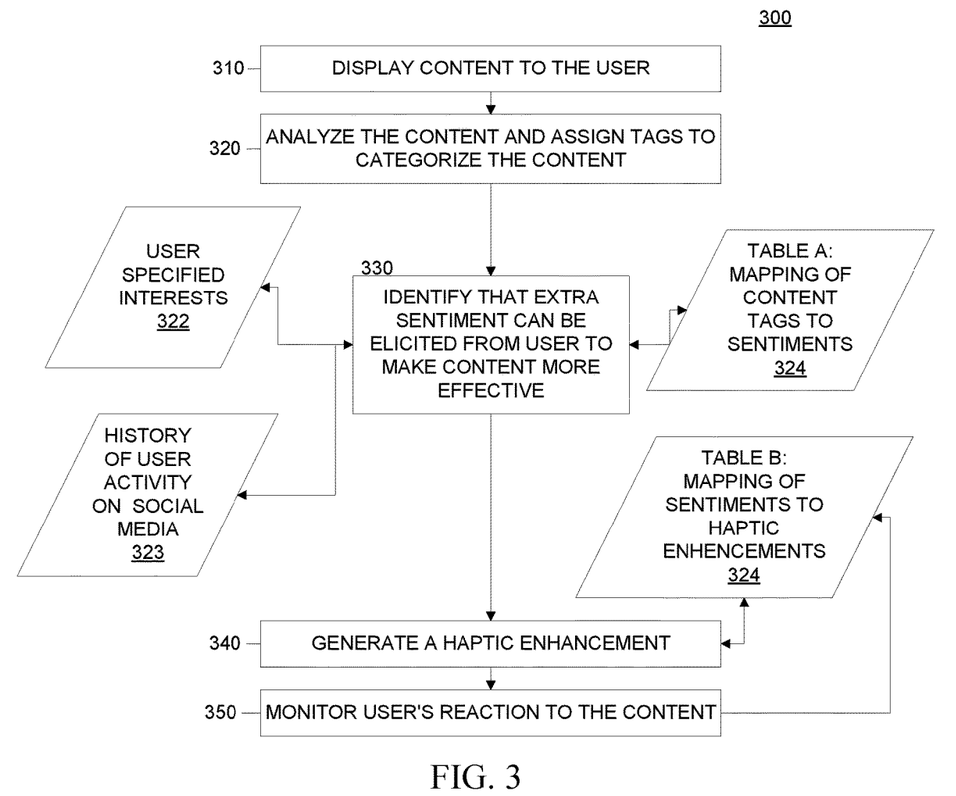
FIG. 3 is both a technical diagram and a workflow illustrating certain aspects of an embodiment of the present invention.

FIG. 3 is an example of some aspects of a technical environment 300 into which aspects of one or more embodiments of the present invention can be implemented, together with certain functionality of one or more programs (executed by one or more processors). Aspects of the one or more programs and technical aspects of the environment are shown together in FIG. 3 in order to illustrate the interplay between the one or more programs with structural elements of certain embodiments of the present invention, and with other systems, which may inform the activities of the one or more programs. FIG. 3 also shows the real-time functionality of certain embodiments, where the content is already displayed when the one or more programs implement a physical change. Thus, the one or more programs have the ability to adapt, immediately, to content and to increase the efficacy of the content by implementing a physical change when the user is still considering the content.

As illustrated in FIG. 3, one or more programs display content to the user (310). Based on the content being displayed, the one or more programs analyze the content and assign tags to categorize the content (e.g., fundraising, political, educational, sale of an item) (320). The one or more programs identify that extra sentiment can be elicited from user (and what that sentiment is) to make content more effective (330). In order to make this identification, the one or more programs reference various sources. For example, the one or more programs may reference user specified interests 322 and/or a history of user activity on social media (to determine interests) 323. The one or more programs generate, as well as reference, a table 324 (Table A). Table A 324 includes mappings of content tags to sentiments (based on identified user interests). The one or more programs generate, reference, and update this table. In some embodiments of the present invention, TABLE A 324 may include mappings of content tags, sentiments, and user interests (e.g., <political>, <user's political views>, <indignation/excitement>). The one or more programs reference a pre-configured table 325 (Table B) that includes mappings of sentiments to haptic enhancements.

Based on various data sources (specified interests 322, user activity on social media (to determine interests) 323, Table A 324, and/or Table B 325), the one or more programs generate a haptic enhancement (340). Haptic enhancements may include, but are not limited to, making changes to an I/O device, such as a keyboard or a mouse such as making a surface rougher or smoother, lighting up certain inputs (keys, buttons), changing a color of a backlight. The one or more monitor the user's reaction to the content (350). By monitoring the response, the one or more programs may determine whether the haptic enhancement was effective. The one or more programs update Table B 325, based on the response.

An example of the utility of embodiments of the present invention is realized in fundraising ventures. For example, the one or more programs can establish, based on a user's social media history (e.g., FIG. 3, 323), that the user has a personal connection with the target of an advertisement, based on the user's interest/knowledge of the target (e.g., a geographic region, social issues) (e.g., FIG. 3, 322). The advertisement would be more effective if it can attract increased attention from the user. Based on a mapping from Table A 324 (<location>, <user familiarity with location>, <excitement>), the one or more programs assign the sentiment of "excitement" to the content. Based on a mapping from Table B 325, the one or more programs apply operational functions to change the mouse button texture from smooth to rough, an enhancement mapped to the sentiment of "excitement" in Table B 325 (in this example). In this manner, the one or more programs have identified a haptic enhancement to trigger maximum attention, to the advertisement, from the user. Once the user has clicked the mouse button (selecting the advertisement), the one or more programs return the mouse button to its previous texture.

Embodiments of the present invention include a computer-implemented method, a computer program product, and a computer system that include one or more programs that obtain content displayed to a user on a computing device, where the computing device is communicatively coupled to one or more input devices or output devices. The one or more programs analyze the content to identify portions of the content that represent types of content and tag the identified portions with one or more generic tags, where each tag represents a predefined type of content. The one or more programs generate a sentiment profile of the user, where the generating includes: the one or more programs identifying interests of the user and the one or more programs identifying subjects of past electronic communications by the user. The one or more programs map sentiments in the sentiment profile of the user, to topics, based on the interests and the subjects identified. The one or more programs identify, based on the one or more generic tags, an identified portion of the content relevant to at least one topic mapped to a sentiment in the sentiment profile. The one or more programs generate a physical change to at least one of the one or more input devices or output devices to elicit a sentiment from the user, where the sentiment is mapped to the at least one topic. The one or more programs implement the physical change.

In some embodiments of the present invention, the one or more input or output devices include: a mouse, a keyboard, and a display.

In some embodiments of the present invention, the physical change includes a haptic enhancement.

In some embodiments of the present invention, the haptic enhancement is one or more of: changing a physical characteristic of the mouse, light up certain keys on the keyboard, and/or changing a backlight on the display. Changing the physical characteristic of the mouse may include changing the texture of a button on the mouse.

In some embodiments of the present invention, the one or more programs identify interests of the user by soliciting data from the user, via a graphical user interface, regarding the interests of the user. In some embodiments, the one or more programs identify subjects of past electronic communications by the user by identifying social media activity of the user.

In some embodiments of the present invention, the one or more programs generate the physical change by accessing a preconfigured table comprising mappings of each of the sentiments in the sentiment profile of the user to an individual physical change to invoke each sentiment. The one or more programs identify the physical change as being mapped to the sentiment.

In some embodiments of the present invention, the one or more programs monitor a response of the user to the physical change, where the response includes subsequent actions taken by the user, on the computing device. The one or more programs update the mapping of the sentiments in the sentiment profile of the user, to the topics, based on the response.

In some embodiments of the present invention, the one or more programs monitor a response of the user to the physical change, where the response includes an absence of subsequent actions taken by the user, on the computing device. The one or more programs update the mapping of the sentiments in the sentiment profile of the user, to the topics, based on the response.

In some embodiments of the present invention, the one or more programs reverse the physical change, based on one or more of: the response (of the user to the physical change) or passage of a predefined period of time (after implementing the change).

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resource(s), including the processors that execute the one or more programs that implement physical changes to I/O devices can be understood as part of one or more cloud computing nodes 10 (FIG. 4) and if not examples of portions of a cloud computing node 10, then a portion of one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
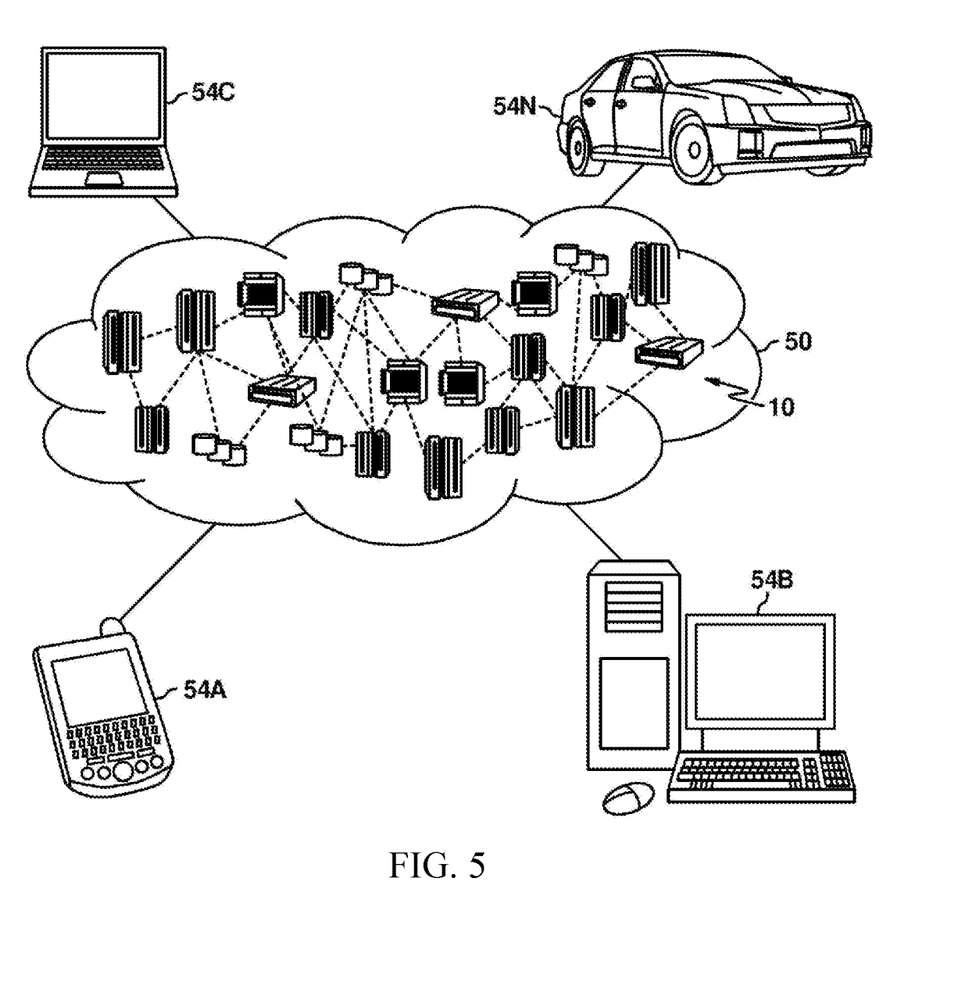
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
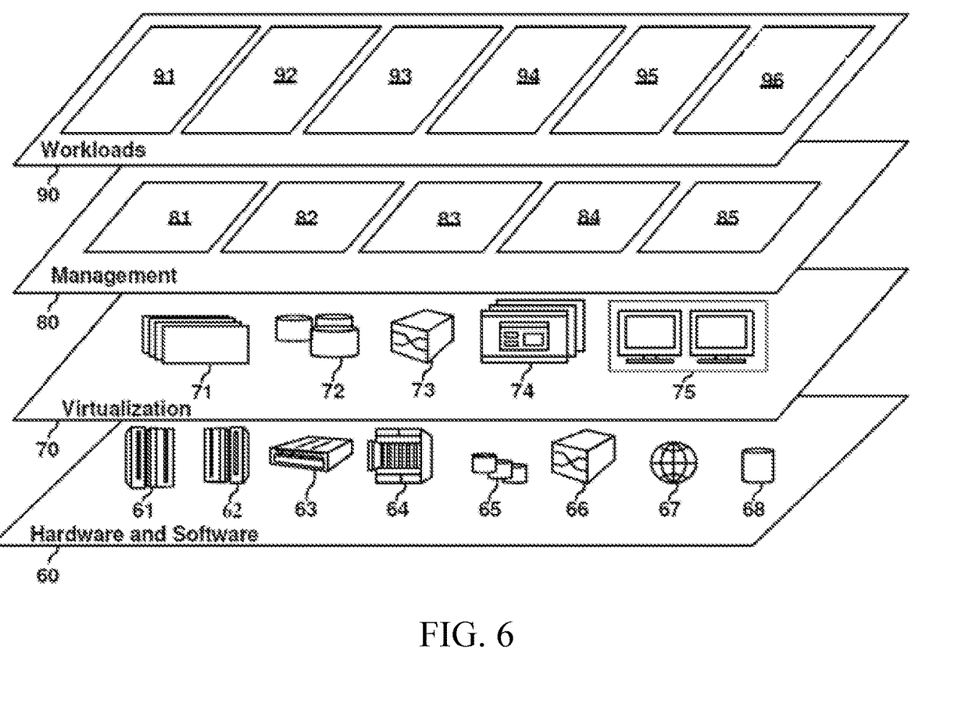
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and implementing physical changes to I/O devices 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive, or limited to, the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, content displayed to a user on a computing device, wherein the computing device is communicatively coupled to one or more input devices or output devices;
   analyzing, by the one or more processors, the content, to identify portions of the content that represent types of content and tagging the identified portions with one or more generic tags, wherein each tag represents a predefined type of content;
   generating, by the one or more processors, a sentiment profile of the user, wherein the generating comprises: identifying interests of the user and identifying subjects of past electronic communications by the user;
   mapping, by the one or more processors, sentiments in the sentiment profile of the user, to topics, wherein each topic comprises a topic of discussion in a post on social media, based on the interests and the subjects identified, wherein the sentiments comprise empathy, anger, and excitement wherein the sentiments are determined based on the user's past interactions with each topic in discussions on social media, wherein the mapping comprises analyzing the past interactions of the user with each topic to determine that it is likely for the user to interact with each topic based on historic sustained reactions by reaction type associated with said topic:

identifying, by the one or more processors, based on the one or more generic tags, an identified portion of the content relevant to at least one topic mapped to a sentiment in the sentiment profile;

generating, by the one or more processors, a physical change to at least one of the one or more input devices or output devices to elicit a sentiment from the user, wherein the sentiment is mapped to the at least one topic, wherein the at least one of the one or more input devices or output devices is selected from the group consisting of: a mouse, a keyboard, and a display; and implementing, by the one or more processors, the physical change to the at least one of the one or more input devices or output devices, wherein the physical change is to elicit the sentiment mapped to the at least one topic from the user, wherein the implementing comprises:

accessing, by the one or more processors, a preconfigured table comprising mappings of each of the sentiments in the sentiment profile of the user to an individual physical change to invoke each sentiment: and identifying, by the one or more processors, the physical change as being mapped to the sentiment:

monitoring, by the one or more processors, a reaction of the user to the physical change to determine if the physical change elicited the sentiment: and updating, by the one or more processors, the preconfigured table based on the determination.

2. The computer implemented method of claim 1, wherein the at least one of the one or more input devices or output devices comprises the mouse or the keyboard, and wherein the physical change comprises a haptic enhancement selected from the group consisting of: changing texture of certain keys, changing a temperature of areas of the keyboard, and changing a tactile feel of the mouse.

3. The computer-implemented method of claim 1, wherein the physical change comprises a haptic enhancement.

4. The computer-implemented method of claim 3, wherein the haptic enhancement is selected from the group consisting of: changing a physical characteristic of the mouse, light up certain keys on the keyboard, and changing a backlight on the display.

5. The computer-implemented method of claim 4, wherein the haptic enhancement comprises changing the physical characteristic of the mouse and the physical characteristic is a texture of a button on the mouse.

6. The computer-implemented method of claim 1, wherein identifying interests of the user comprises soliciting data from the user, via a graphical user interface, regarding the interests of the user.

7. The computer-implemented method of claim 1, wherein the reaction of the user comprises a response of the user to the physical change, wherein the response comprises subsequent actions taken by the user, on the computing device, and wherein updating the preconfigured table comprises updating the mapping of the sentiments in the sentiment profile of the user, to the topics.

8. The computer-implemented method of claim 1, further comprising: wherein the reaction of the user comprises a response of the user to the physical change, wherein the response comprises an absence of subsequent actions taken by the user, on the computing device and wherein updating the preconfigured table comprises updating the mapping of the sentiments in the sentiment profile of the user, to the topics.

9. The computer-implemented method of claim 1, further comprising:

reversing, by the one or more processors, the physical change, based on one or more of: the reaction or passage of a predefined period of time.

10. A computer program product comprising:

a computer readable storage medium readable by one or more processors and storing instructions for execution by the one or more processors for performing a method comprising:

obtaining, by the one or more processors, content displayed to a user on a computing device, wherein the computing device is communicatively coupled to one or more input devices or output devices;

analyzing, by the one or more processors, the content, to identify portions of the content that represent types of content and tagging the identified portions with one or more generic tags, wherein each tag represents a predefined type of content;

generating, by the one or more processors, a sentiment profile of the user, wherein the generating comprises: identifying interests of the user and identifying subjects of past electronic communications by the user;

mapping, by the one or more processors, sentiments in the sentiment profile of the user, to topics, wherein each topic comprises a topic of discussion in a post on social media, based on the interests and the subjects identified, wherein the sentiments comprise empathy, anger, and excitement, wherein the sentiments are determined based on the user's past interactions with each topic in discussions on social media, wherein the mapping comprises analyzing the past interactions of the user with each topic to determine that it is likely for the user to interact with each topic based on historic sustained reactions by reaction type associated with said topic:

identifying, by the one or more processors, based on the one or more generic tags, an identified portion of the content relevant to at least one topic mapped to a sentiment in the sentiment profile;

generating, by the one or more processors, a physical change to at least one of the one or more input devices or output devices to elicit a sentiment from the user, wherein the sentiment is mapped to the at least one topic, wherein the at least one of the one or more input devices or output devices is selected from the group consisting of: a mouse, a keyboard, and a display; and implementing, by the one or more processors, the physical change to the at least one of the one or more input devices or output devices, wherein the physical change is to elicit the sentiment mapped to the at least one topic from the user, wherein the implementing comprises:

accessing, by the one or more processors, a preconfigured table comprising mappings of each of the sentiments in the sentiment profile of the user to an individual physical change to invoke each sentiment; and identifying, by the one or more processors, the physical change as being mapped to the sentiment;

monitoring, by the one or more processors, a reaction of the user to the physical change to determine if the physical change elicited the sentiment; and updating, by the one or more processors, the preconfigured table based on the determination.

11. The computer program product of claim 10, wherein the at least one of the one or more input devices or output devices comprises the mouse or the keyboard, and wherein the physical change comprises a haptic enhancement selected from the group consisting of: changing texture of certain keys, changing a temperature of areas of the keyboard, and changing a tactile feel of the mouse.

12. The computer program product of claim 10, wherein the physical change comprises a haptic enhancement.

13. The computer program product of claim 12, wherein the haptic enhancement is selected from the group consisting of: changing a physical characteristic of the mouse, light up certain keys on the keyboard, and changing a backlight on the display.

14. The computer program product of claim 13, wherein the haptic enhancement comprises changing the physical characteristic of the mouse and the physical characteristic is a texture of a button on the mouse.

15. The computer program product of claim 10, wherein identifying interests of the user comprises soliciting data from the user, via a graphical user interface, regarding the interests of the user.

16. A host computing system comprising:
a memory;
one or more processors in communication with the memory;
program instructions executable by the one or more processors via the memory to perform a method, the method comprising:
obtaining, by the one or more processors, content displayed to a user on a computing device, wherein the computing device is communicatively coupled to one or more input devices or output devices;
analyzing, by the one or more processors, the content, to identify portions of the content that represent types of content and tagging the identified portions with one or more generic tags, wherein each tag represents a pre-defined type of content;
generating, by the one or more processors, a sentiment profile of the user, wherein the generating comprises: identifying interests of the user and identifying subjects of past electronic communications by the user;
mapping, by the one or more processors, sentiments in the sentiment profile of the user, to topics, wherein each topic comprises a topic of discussion in a post on social media, based on the interests and the subjects identified, wherein the sentiments comprise empathy, anger, and excitement, wherein the sentiments are determined based on the user's past interactions with each topic in discussions on social media, wherein the mapping comprises analyzing the past interactions of the user with each topic to determine that it is likely for the user to interact with each topic based on historic sustained reactions by reaction type associated with said topic:
identifying, by the one or more processors, based on the one or more generic tags, an identified portion of the content relevant to at least one topic mapped to a sentiment in the sentiment profile;
generating, by the one or more processors, a physical change to at least one of the one or more input devices or output devices to elicit a sentiment from the user, wherein the sentiment is mapped to the at least one topic, wherein the at least one of the one or more input devices or output devices is selected from the group consisting of: a mouse, a keyboard, and a display; and
implementing, by the one or more processors, the physical change to the at least one of the one or more input devices or output devices, wherein the physical change is to elicit the sentiment mapped to the at least one topic from the user, wherein the implementing comprises:
accessing, by the one or more processors, a preconfigured table comprising mappings of each of the sentiments in the sentiment profile of the user to an individual physical change to invoke each sentiment; and
identifying, by the one or more processors, the physical change as being mapped to the sentiment;
monitoring, by the one or more processors, a reaction of the user to the physical change to determine if the physical change elicited the sentiment; and
updating, by the one or more processors, the preconfigured table based on the determination.

* * * * *